United States Patent
Amiel et al.

(10) Patent No.: US 9,536,244 B1
(45) Date of Patent: Jan. 3, 2017

(54) MANAGED CONTENT DELIVERY VIA WEB SERVICES

(75) Inventors: Meir Amiel, Pleasanton, CA (US);
Victor Spivak, San Mateo, CA (US);
Alex Oscherov, Danville, CA (US)

(73) Assignee: EMC Corporation, Hopkinton, MA (US)

(*) Notice: Subject to any disclaimer, the term of this patent is extended or adjusted under 35 U.S.C. 154(b) by 1378 days.

(21) Appl. No.: 11/430,433

(22) Filed: May 8, 2006

Related U.S. Application Data

(60) Provisional application No. 60/787,445, filed on Mar. 30, 2006.

(51) Int. Cl.
*G06Q 30/00* (2012.01)
*G06F 9/44* (2006.01)
*G06Q 30/02* (2012.01)

(52) U.S. Cl.
CPC ............. *G06Q 30/02* (2013.01); *G06F 8/24* (2013.01)

(58) Field of Classification Search
CPC .................................. G06Q 30/02; G06F 8/24
USPC ..... 705/1–30; 707/1–10, 219, 102; 709/203; 717/177, 143, 139, 136, 108; 719/318
See application file for complete search history.

(56) References Cited

U.S. PATENT DOCUMENTS

| | | | | |
|---|---|---|---|---|
| 6,643,652 | B2* | 11/2003 | Helgeson et al. | 707/10 |
| 2004/0015564 | A1* | 1/2004 | Williams | 709/219 |
| 2004/0111533 | A1* | 6/2004 | Beisiegel et al. | 709/246 |
| 2005/0055626 | A1* | 3/2005 | Kotler et al. | 715/503 |
| 2007/0156702 | A1* | 7/2007 | Jain | 707/10 |
| 2007/0168868 | A1* | 7/2007 | Korzenko | G06F 17/246 715/732 |

* cited by examiner

*Primary Examiner* — Sun Li
(74) *Attorney, Agent, or Firm* — Van Pelt, Yi & James LLP

(57) ABSTRACT

Providing access to manage content via a web service is disclosed. A business object that includes a method configured to access a content item comprising a body of managed content is received. The business object is processed to project as a web service a content management functionality associated with the object, including by exposing a method of the business object as a web service operation.

25 Claims, 10 Drawing Sheets

MANAGED CONTENT DELIVERY VIA WEB SERVICES

This application claims priority to U.S. Provisional Patent Application No. 60/787,445 entitled Managed Content Delivery Via Web Services filed Mar. 30, 2006, which is incorporated herein by reference for all purposes.

BACKGROUND OF THE INVENTION

Content management systems provide content management services with respect to a body of content, enabling a user to store, access, and manage content (check-in, check-out, version, etc.); to define and enforce access restrictions, retention, and other policies; and to define and automate content lifecycles, business processing, etc. In some cases a user (person) interacts with a content management system, e.g., through a web-based or other application configured to access and/or store content associated with the content management system.

Content management systems have been provided that include development kits that enable users, third party developers, and/or developers associated with the content management system vendor to develop quickly and deploy custom software components configured to perform custom content management and/or other operations with respect to content stored on a content management system. However, access to managed content via such components typically is via an application programming interface (API) or other interface associated with the content management system and/or its vendor. It would be beneficial to enable the functionality of such custom components, as well as standard or base components provided by a content management system vendor, to be access through other, e.g., standards-based, interfaces, such as by exposing such functionality as a web service.

BRIEF DESCRIPTION OF THE DRAWINGS

Various embodiments of the invention are disclosed in the following detailed description and the accompanying drawings.

DETAILED DESCRIPTION

Figure 1:
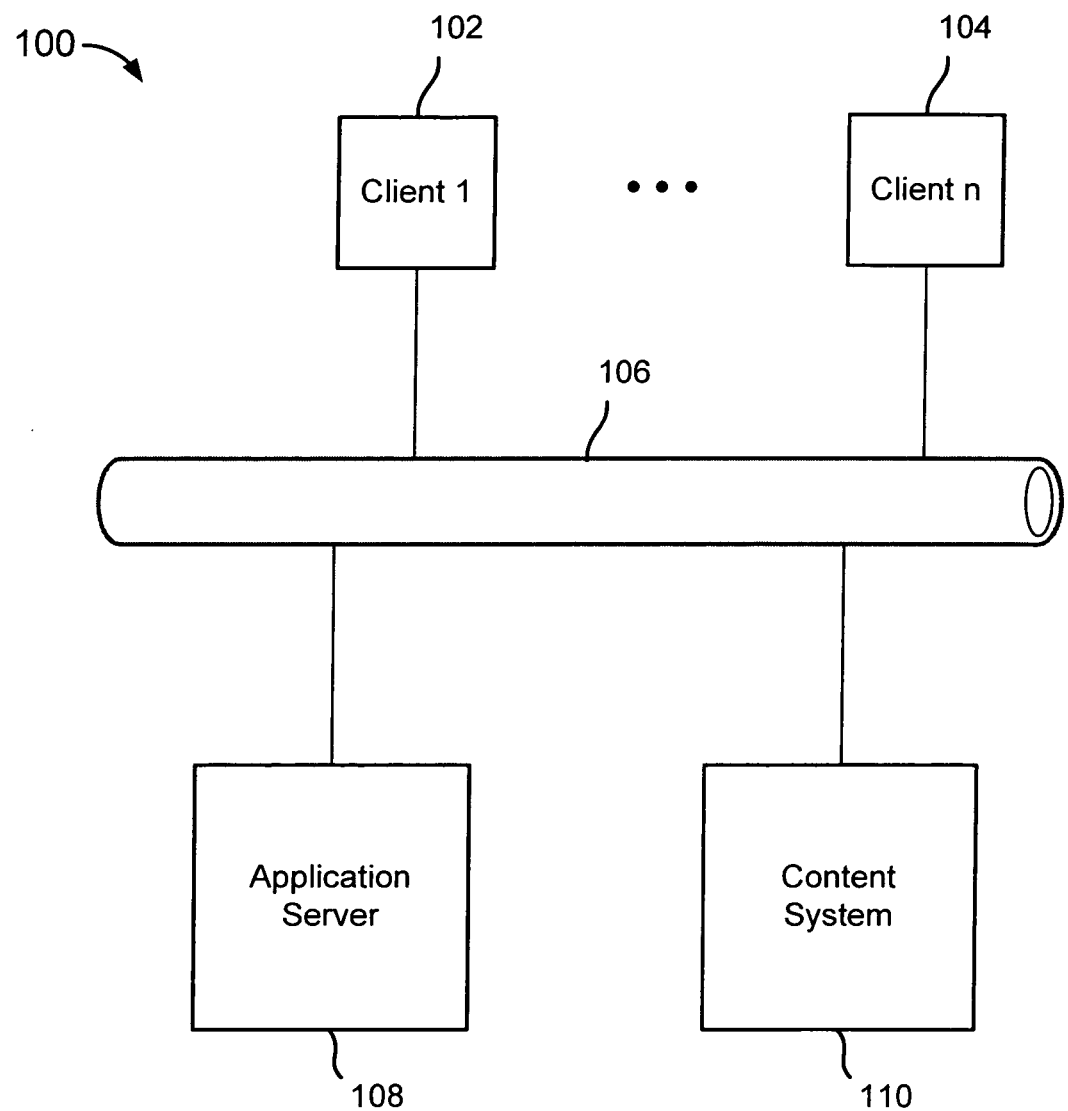
FIG. 1 is a block diagram illustrating an embodiment of a system for accessing and using managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Projecting as a web service content management functionality not originally developed as a web service is disclosed. In some embodiments, a definition of a content management function, such as a business object class or other software component, is received. In some embodiments, a business object class is registered and initially stored at a repository comprising the content management system. The business object class is transformed to generate and project a web service configured to provide the content management functionality provided by and/or via the business object class. Methods of the business object class that require content to be retrieved from a repository in some embodiments are exposed as web service operations that achieve the same result. In some embodiments, methods that require content to be retrieved from a requesting client of a content management system (e.g., client host computer, client application, application server, etc.), e.g., to enable some processing or other manipulation of such content to be performed, are obtained from the client via the content management system, e.g., a content management client/agent on the requesting client. In some embodiments, the content management system includes a distributed content framework, and content is provided to and/or obtained from a client from which a web services operation request is received by selecting and using a content server that is near the requesting client, when possible.

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110. In some embodiments, application server 108 comprises a web services server configured to project one or more content management functions as a web service. In some embodiments, content system 110 comprises a web services server configured to project one or more content management functions as a web service.

Figure 2:
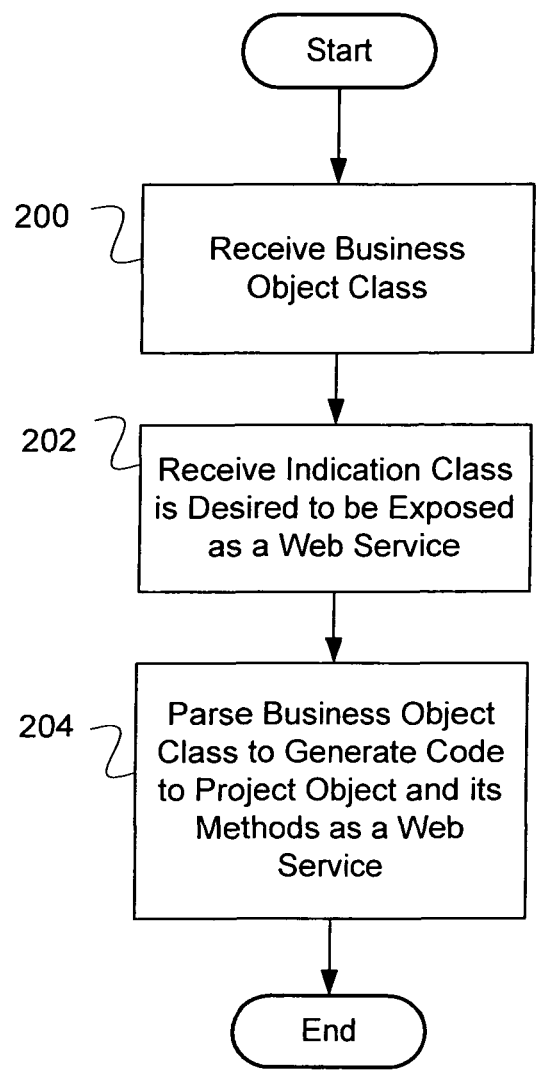
FIG. 2 is a flow chart illustrating an embodiment of a process for projecting content management functionality as a web service.

FIG. 2 is a flow chart illustrating an embodiment of a process for projecting content management functionality as a web service. In the example shown, at 200 a business object class is received. In some embodiments, business objects classes are deployed in and distributed from a managed content repository with which the business object classes are associated. Business object classes are registered at the repository and distributed (e.g., downloaded) on request to one or more systems comprising and/or associated with a content management system with which the repository is associated, such as a client host system, a web or other application server on which one or more applications and/or services are configured to run on and/or in connection with a content management framework associated with the content management system, and/or a content server on which content comprising a body of managed content and/or associated metadata are stored. In various embodiments, a business object class may be defined by a content management system vendor, a customer of the content management system vendor, and/or a third party developer. In some embodiments, development tools are provided to facilitate the development of web-based and/or other applications, such as content authoring applications, that interact with the content management system (e.g., content server) to access, store, and/or otherwise manage content. In some embodiments, the development tools enable a developer to develop custom components in the form of custom business object classes, which the developer registers with the repository. Class learning/loading facilities, e.g., on an application server on which an underlying application with which the component is associated, e.g., an application configured to request instantiation of and/or otherwise create and/or use the component, are used to download the business object class to a destination host, which then instantiates and configures the component to run on the destination host, as required. Client applications (e.g., a browser or other client software running on a host such as clients 102 and 104 of FIG. 1) interact with the application running on the application server, which in turn invokes methods of the business object, as applicable, to perform operations requested by the client.

In some embodiments, however, there may be a desire to expose as a web service content management functionality not developed originally as a web service. A web service is network-based service that supports interoperable computer-to-computer interaction over a network, such as the Internet. A web service has an interface that is described in a standards-based format, such as WSDL, that enable other systems to learn the web service's interface, including such information as the operations available and the syntax to be used (name, arguments, etc.) to invoke such operations. Other systems interact with the web service in a manner prescribed by its interface using messages, which may be enclosed in a SOAP envelope, or follow a REST approach. These messages are typically conveyed using HTTP or another protocol, and normally comprise XML in conjunction with other web-related standards. Software applications written in various programming languages and running on various platforms can use web services to exchange data over computer networks like the Internet in a manner similar to inter-process communication on a single computer. A content management system user may desire to expose functionality of the content management system as a web service, e.g., to take advantage of the platform interoperability, machine-to-machine interactions, and/or other characteristics and/or features available in the web services paradigm.

In the example shown in FIG. 2, at 202 an indication is received that the business object class received at 200 is desired to be exposed (or to be available to later be exposed) as a web service. At 204, the business object class definition is parsed and transformed to generate code configured to project the functionality of the business object class as a web service. In some embodiments, 204 includes generating based on the business object class, and/or intermediate or other data generated during the parsing and/or transformation process, one or more web services operations, each configured to provide as a web services operation the functionality of a corresponding method of the business object class. In some embodiments, 204 includes generating a WSDL or other standards-based description of the generated web service, to enable client applications, systems, or other users desiring to use the web service to learn the functionality, operations, interfaces, and/or syntax of the web service. In some embodiments, 204 includes generating code configured to map strings, e.g., arguments of operations or other calls of the web service, to content items such as files and/or file system paths, of which a web service has no native understanding. In some embodiments, 204 includes configuring a web server or other server to provide the web service. In some embodiments, the web service code generated at 204 is stored and later deployed, e.g., on a web server, in response to a request, such as an explicit request to expose associated functionality as a web service or an implicit request, e.g., an explicit request to perform some other and/or related function that requires that the web service be made available and/or used.

Figure 3:
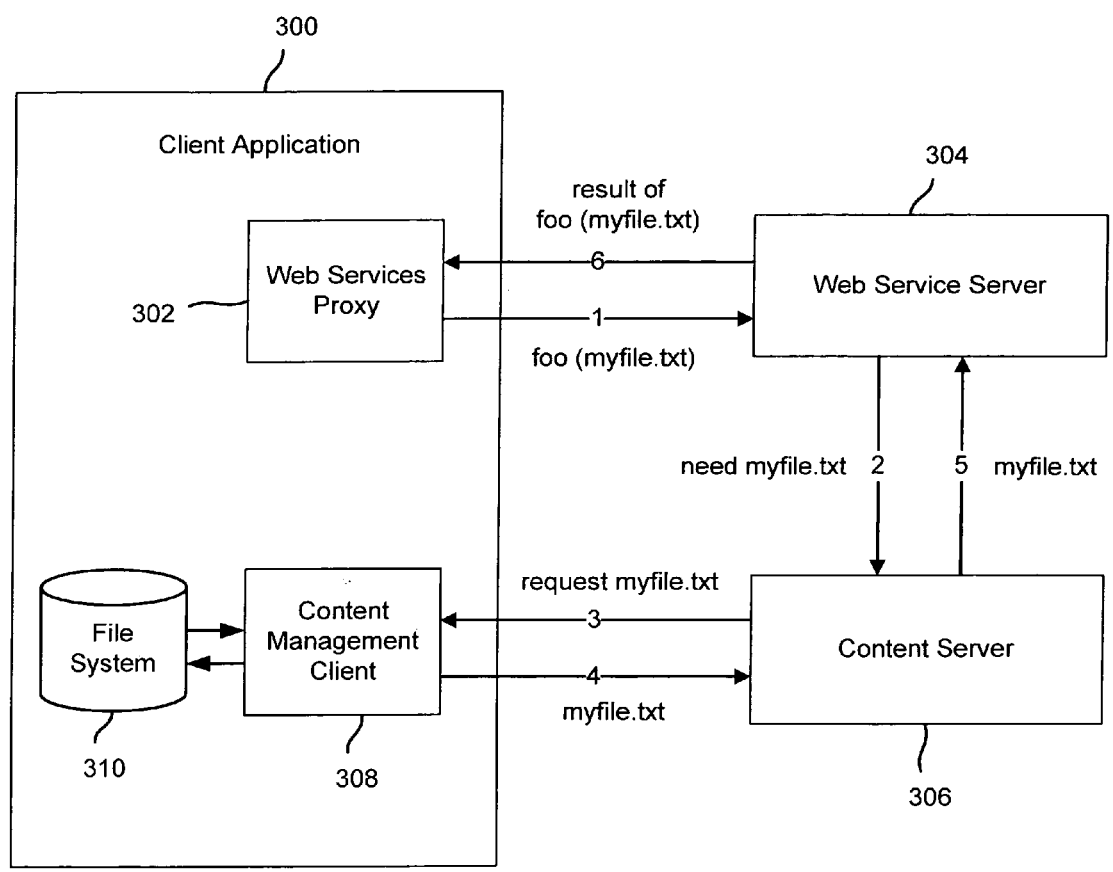
FIG. 3 is a block diagram illustrating an embodiment of a system for providing content management functionality as a web service.

FIG. 3 is a block diagram illustrating an embodiment of a system for providing content management functionality as a web service. In the example shown in FIG. 3, a client application (or system) 300 interacts via a web services proxy 302 and an intervening network with a web services server 304. Web services server 304 is configured to project as a web service on or more content management functions associated with a repository on content server 306. In some embodiments, the web service comprises a web services projection of a business object class received and transformed as in FIG. 2. In various embodiments, web services server 304 and content server 306 are provided on the same or different physical computing systems, and if on different systems may have a network, direct, or other connection between them. In the example shown in FIG. 3, a method of a business object class transformed to generate the web service has been transformed into a web services operation named "foo". In this example, "foo" operates on a content file stored on the requesting client system, e.g., in a file system on the client, and returns a result based on processing performed by the web service on content data comprising the content file. Web services typically do not have a concept of files or file system paths, so in this example the argument of the operation "foo" as requested by the client application (1) is a string "myfile.txt", which in this example is the filename of the file as stored on the client. The web services server 304 receives the operation request, extracts the string, and maps it to a name and/or other identifier usable to obtain the content and sends to content server 306 a request (2) for the content. The content server 306 requests the file (3) from a content management client (or agent) 308 on the client application/system 300. Content management client 308 finds the file in file system 310 on the client and provides the requested file (4) to the content server 306. The content server 306 sends the file (5) to web services server 304, which performs the operation "foo" on the content, which invokes the business object "foo" method with the file provided, and returns a result (6) to the client application/system 300 via web services proxy 302. The approach illustrated in FIG. 3 enables the web services paradigm to be used to provide access to content management functionality while leveraging on an existing content management framework to manage and provide access to content items, in this example a file stored on the client application/system 300. In some embodiments, content server 306 is configured to learn/remember what content is stored on the client application/system 300 and integrate such content into a distributed body of content available to be accessed from one or more nodes.

Figure 4:
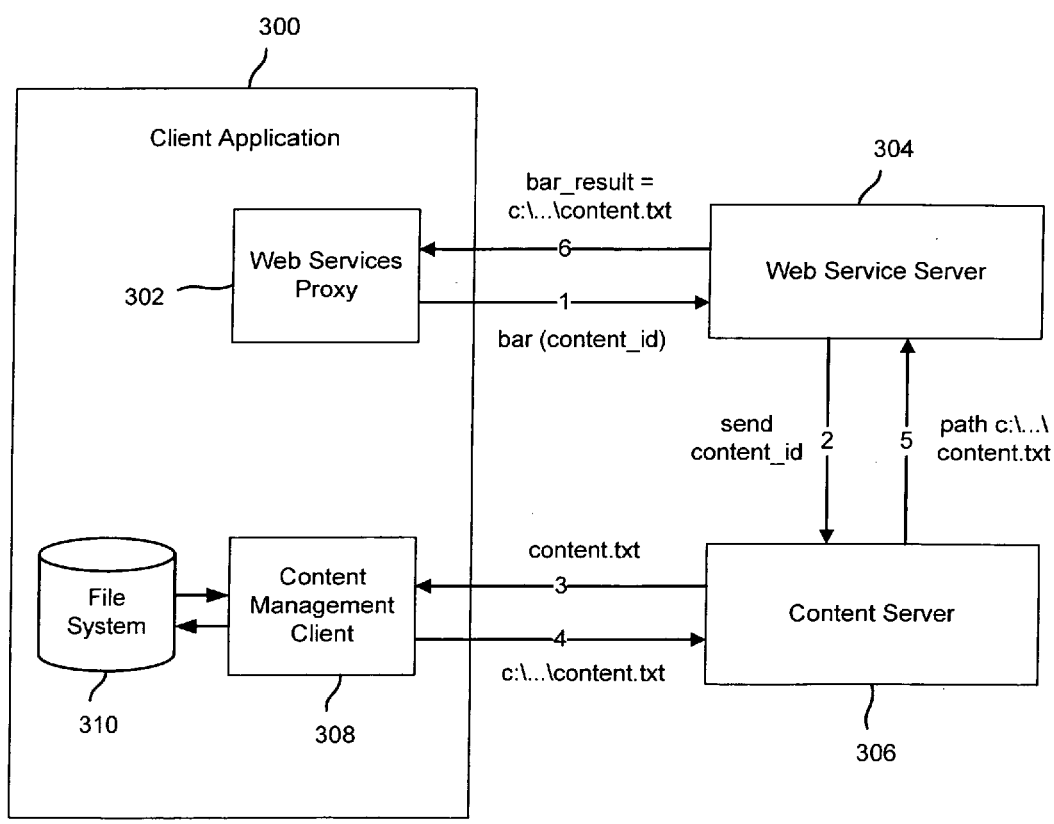
FIG. 4 is a block diagram illustrating an embodiment of a system for providing content management functionality as a web service.

FIG. 4 is a block diagram illustrating an embodiment of a system for providing content management functionality as a web service. In the example shown in FIG. 4, a method of a business object class transformed to generate the web service has been transformed into a web services operation named "bar". In this example, "bar" retrieves a content file stored in a repository. The argument of the operation request (1) is a string, "content_id" in this example, that identifies the content file desired to be retrieved. The web services server 304 is configured to send (2) the content identifier (and/or an identifier to which the argument of the operation "bar" maps) to content server 306. Content server 306 downloads (3) the associated content file "content.txt" to the client application/system 300 via the content management client 308, which stores the content file in the file system 310 and returns to content server 306 a response (4) indicating a file system location (e.g., path) at which the content file was stored in the file system 310 at client application/system 300. Content server 306 provides the path information (5) to web services server 304, which returns (6) the path information to client application/system 300. The client application/system that sent the original request that the web service operation "bar" be performed now knows where to find the content item as stored on client application/system 300. As in the example shown in FIG. 3, the approach illustrated in FIG. 4 enables content management functionality to be exposed as a web service while making use of existing content management infrastructure (e.g., content management client 308 and/or content server 306) to access, store, and/or otherwise manage content.

The examples shown in FIGS. 3 and 4 are provided by way of example. The approaches described herein may be used to project as a web service any content management function that requires that content be accessed, stored, and/or otherwise managed. Further examples include writing content residing on a client application/system to a managed content repository, and managing content in a distributed content environment and/or framework, as described more fully below.

Projecting a content management function as a web service in a distributed managed content environment and/or framework is disclosed. An example of a distributed managed content environment and/or framework is one in which two or more content servers and/or other storage systems are used to store a body of managed content. In some embodiments, the two or more systems and/or content stored on them comprise a single repository. In some embodiments, the two or more systems and/or associated content comprise two or more federated repositories. In some embodiments, content is and/or may be mirrored, i.e., stored on two or more systems. Requests to retrieve content are serviced in some embodiments by providing the content from a content server that is "nearer" to the requestor in some sense (geographic region/distance, connection speed, etc.) than some other content server from which the content also is or could be made available. In some embodiments, content server 306 of FIGS. 3 and 4 comprises one of a plurality of content servers comprising a distributed body of managed content. In some embodiments, web services server 304 is configured to select, e.g., based on factors such as which content servers have a needed content item, which of the content servers able to serve a request is nearest to a host that needs the content and/or desires to upload a content item to the repository, etc., a content server to perform the content management tasks associated with a content management function projected as a web service. In some embodiments, the web services server communicates with a master content server that in turn may delegate one or more tasks to a content server nearer to the requesting host than the master is.

Figure 5:
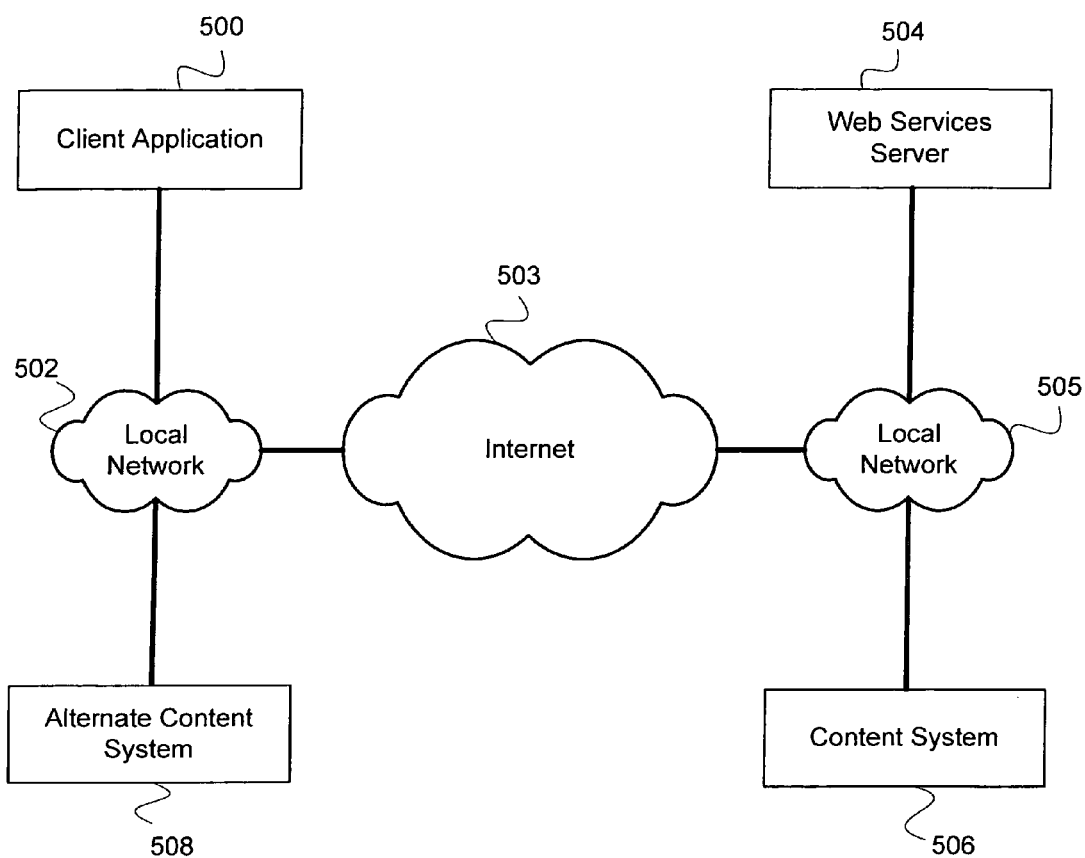
FIG. 5 is a block diagram illustrating an embodiment of a system for providing access to distributed managed content via a web service.

FIG. 5 is a block diagram illustrating an embodiment of a system for providing access to distributed managed content via a web service. In the example shown, client application/system 500 is connected to local network 502. In various embodiments, network 502 includes one or more of the following: a local area network, a wide area network, a wireless network, a wired network, the internet, an intranet, and/or any other network for connecting systems. In the example shown, web services server 504, content system 506, and alternate content system 508 comprise a distributed content management framework. Alternate content system 508 is connected to network 502 and in this example is geographically local to client application/system 500; e.g., they are connected via the same local area network, same metropolitan area network, etc. Web services server 504 and content system 506 are connected to local network 505 and in this example are geographically collocated. Web services server 504 and content system 506 have network connectivity to client application/system 500 and alternate content system 508 via the Internet 503.

In some embodiments, content in alternate content system is accessible via web services server 504 and contains files, objects, metadata, or other data that may or may not also be contained in content system 506. In some embodiments, a copy of at least a portion of the content stored on content system 506 is stored on alternate content system 508, e.g., by mirroring content stored on content system 506 and/or another content store associated with web services server 504 to alternate content system 508. In various embodiments, content is mirrored to alternate content system 508 periodically, as changes to data store on content system 506 occur, and/or as particular content and/or updates are requested from and/or directed to be served by alternate content system 508. In some embodiments, alternate content system 508 is one of a plurality of alternate content systems comprising a distributed content management framework or system. In various embodiments, a content system is selected from among a plurality of content systems comprising content system 506, alternate content system 508, and/or one or more other alternate content systems (not shown in FIG. 5), to service a particular request. In various embodiments, a content system is selected to interact with client application/system 500 (or determined to be preferred over one or more other content systems) based on criteria such as one or more of the following: distance from client application/system 500, bandwidth available for communication between client application/system 500 and the selected content system, speed of access between client application/system 500 and the selected content system, and/or any other relevant metric. In some embodiments, a locator or a prioritized list of locators (e.g., a locator for each of two or more content systems capable of servicing the request) usable to read content from or write (store) content to one or more content systems is provided to client application/system 500 by web services server 504 based at least in part on information—including, for example, candidate file(s) or object(s) location(s), distances from remote system 500 of respective content systems, bandwidth access to content system(s), and candidate file(s) or object(s) attributes (e.g. encryption and/or compression characteristics)—received from content system 506.

In some embodiments, client application/system 500 is one of a plurality of hosts able to access web services server 504 via networks 502, 503 and/or 505. In some embodiments, content system 506 and/or alternate content system 508 are implemented in one or more physical computer systems each of which includes one or more storage devices. In some embodiments, for at least some requests (e.g., for objects larger than a threshold size) web services server 504, is configured to obtain from content system 506 and/or alternative content system 508, and the content system is configured to provide, data required by web services server 504 to form a URL or other identifier, locator, etc. to be provided by web services server 504 to client application/system 500 to enable client application/system 500 to obtain requested content directly from content system 506 and/or alternate content system 508, as applicable. In some embodiments, as described above, a client or agent running on the client application/system interacts with a content system to read/write content directly from/to the content system.

Figure 6:
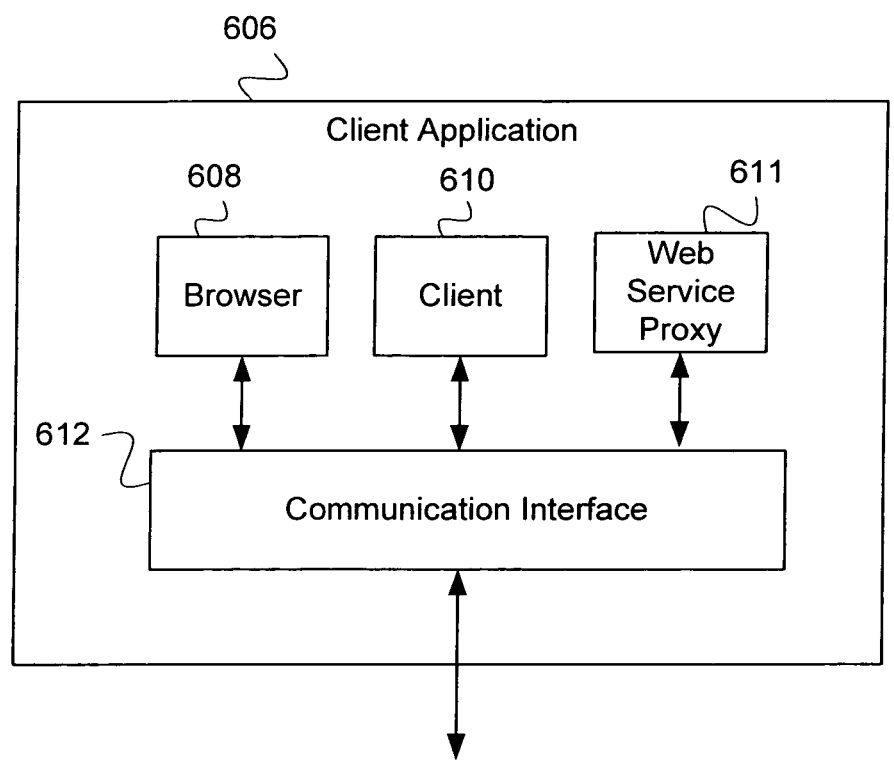
FIG. 6 is a block diagram illustrating an embodiment of a client application/system.

FIG. 6 is a block diagram illustrating an embodiment of a client application/system. In the example shown, system 606 includes browser 608, content management client 610, and web services proxy 611, each configured to communicate with remote hosts via and communication interface 612. In some embodiments, browser 608 interacts with a user to obtain information for and provide information from the remote system. In some embodiments, browser 608 interacts with the user by displaying information on a monitor and by receiving information from the user from a keyboard and/or a mouse. Communication interface 612 is used to communicate with a connected network, such as network 502 of FIG. 5. In some embodiments, system 606 includes storage devices and/or memory, not shown in FIG. 6, to store information, and one or more processors to process information. In various embodiments, browser 608 comprises an internet browser, Microsoft Internet Explorer™, Mozilla Firefox™, a Microsoft Outlook™ plug-in, or any other application interfacing with the user and allowing navigation of a stored set of content. In some embodiments, browser 608 and/or web services proxy 611 and communication interface 612 are used to exchange data with a web services server, such as web services server 504 of FIG. 5, which in various embodiments comprises a web or other application server or another system configured to provide via a web service access to stored content. In some embodiments, web services proxy 611 and communication interface 612 are used to send to a web services server a web services operation request requiring access to content stored in a repository and receive from the web services server a response indicating a location (e.g., file system path) on the client application/system 606 to which the requested content has been downloaded (e.g., as in FIG. 4). In some embodiments, client 610 provides functionality beyond the functionality it would be practical and/or possible to provide using browser 608 and/or web services proxy 611 alone to interact with the web services server and/or content system. In some embodiments, client 610 tracks the status of content transfers and handles interrupted data transfers by resuming where the transfer was interrupted from the same or a different source (e.g. the next content source in a prioritized list of content sources). In some embodiments, client 610 handles the details of the data transfer by determining and/or tracking the locations on the storage devices where the data is coming from and to. In some embodiments, browser 608 and/or web services proxy 611 are used to send a request for content to the web services server and the web services server responds by sending to client 610, via web services proxy 611, a URL or other locator usable by the client 610 to obtain the requested content directly from a content system, e.g., a content system selected by the web services server and/or an associated content system from among a plurality of content systems able to service the request. In some embodiments, client 610 uses the URL or other locator to request and receive the content directly from the content system. In various embodiments, system 606 is implemented using one computer system, multiple computer systems, or any other appropriate hardware and software systems.

In some embodiments, system 606 spawns client 610 to receive the content locator (and/or prioritized list of locators) and obtain the content from the content system (and/or a first available one of the content systems associated with the respective locators in the prioritized list) using the content locator. Client 610 also handles errors, picks up data transfers from where they left off after an interruption, and retrieves content from a different (e.g., backup, secondary, etc.) content system if the original system is no longer available to transfer content. In addition, client 610 takes care of handshaking (e.g., mutual authentication) between the web services server and system 606 as well as the content system and the system 606. Client 610 manages the location that data is transferred to and from including the relevant folder locations, the file and/or object names, how to display the folders, and any differences required due to operating system conventions (e.g. different naming protocols, etc.). In some embodiments, client 610 handles a digital signature or other type of security that allows verification of the interaction between system 606 and the web services server and between the between system 606 and the content system. In various embodiments, client 610 handles compression or decompression and/or encryption or decryption of the transferred content as appropriate. In some embodiments, client 610 reverts to the transfer of content through the web services server in the event that it is not possible (for file structure, access, or any other reason) to transfer content directly to or from the content system.

Figure 7:
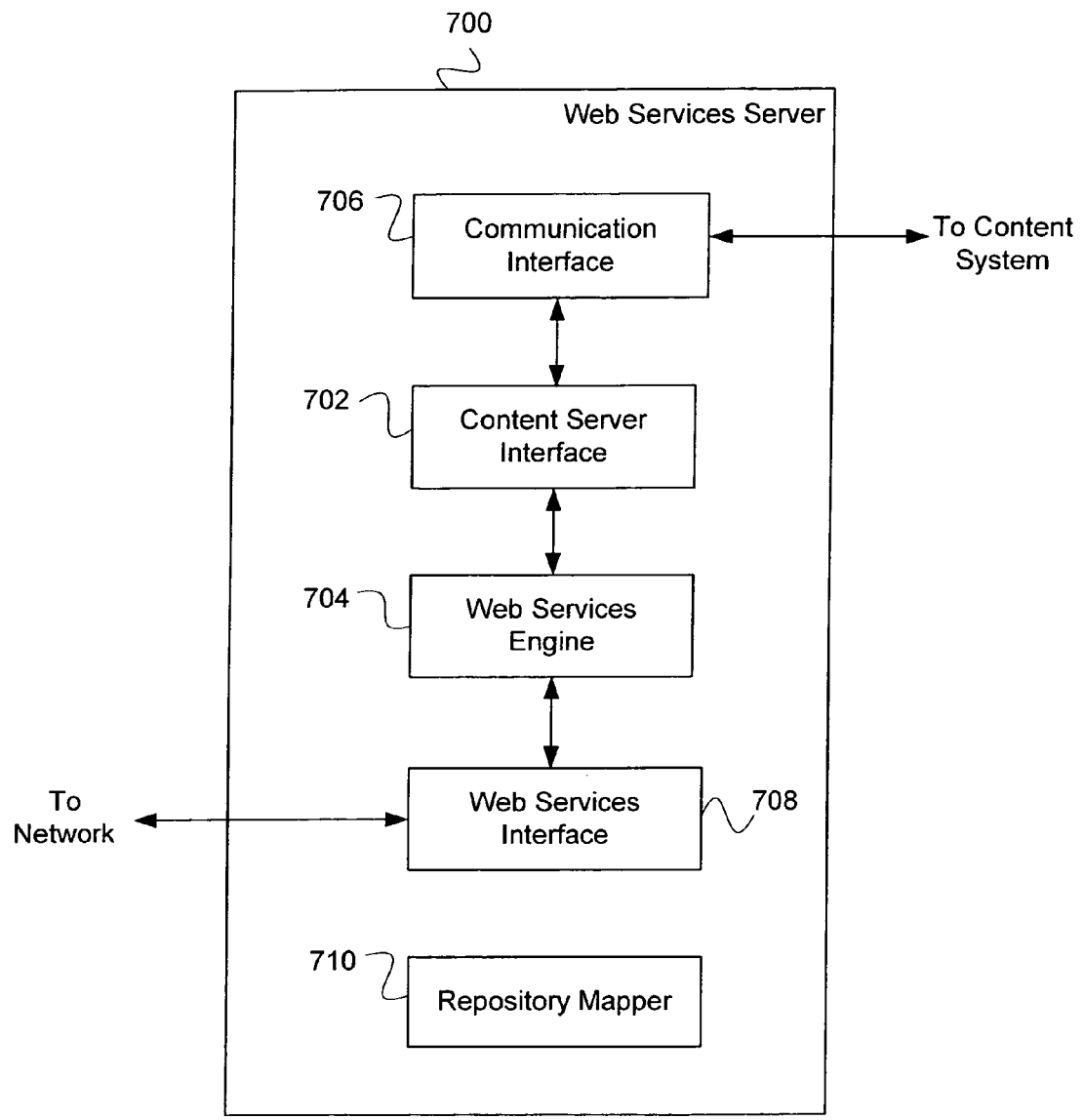
FIG. 7 is a block diagram illustrating an embodiment of a web services server.

FIG. 7 is a block diagram illustrating an embodiment of a web services server. In the example shown, web services server 700 includes web services interface 708, web services engine 704, content server interface 702, communication interface 706, and repository mapper 710. Web services interface 708 is configured to communicate via a network interface, such as a network interface card (NIC) or other interface, with one or more hosts. Each host comprises a web services proxy configured at least in part as specified by a WSDL or other definition of a web service that web services server 700 is configured to provide, which web services proxy communicates with web services server 700 via web services interface 708 in a manner specified in the WSDL or other definition. In some embodiments, the WSDL or other definition is made available for download from a repository with which web services server 700 is associated. Web services engine 704 processes web services requests (e.g., operation requests) received via web services interface 708. In some embodiments, web services engine 704 comprises software code running on a processor (not shown) comprising web services server 700. In some embodiments, web services engine 704 and/or web services interface 708 are configured and/or provided at least in part by transforming a business object class configured to perform a content management function into code usable to project the content management function as a web service. Web services engine 704 is connected to content server interface 702 and communicates with one or more content servers via content server interface 702 and communication interface 706, as required to request content-related services such as that a content item be downloaded to a requesting host and/or that a content item stored on a requesting host be retrieved by the content server from the requesting host and provided by the content system to the web services engine to enable the content to be processed as required to respond to a web services request received from the requesting host. Repository mapper 710 determines which, if any, alternate content servers are available to service a request, e.g., by using a list or other data store to determine which content server(s) can service a particular request (e.g., which have a content item requested to be retrieved) and of those which content server is best able to service the request (e.g., which is closest geographically and/or has the fastest connection to the requesting host). In some embodiments, repository mapper 710 creates a repository map periodically and caches the map in order to reduce resources that would be required to create a repository map for each request.

In some embodiments, content server interface 702 comprises a framework for managing content for web or other applications running on web services server 700. In some embodiments, content server interface 702 comprises classes of content management objects that web services engine 704 may be configured to invoke, as required, e.g., in a manner specified in an API (application programming interface) or other specification or definition, to accomplish content management related tasks, such as storing, tracking, finding, retrieving, associating metadata with, and otherwise managing stored content. In some embodiments, content system server 702 includes an API and/or a library that provides an API to the content server. In some embodiments, content server interface 702 comprise software code executed by one or more processors associated with web services server 700.

Figure 8:
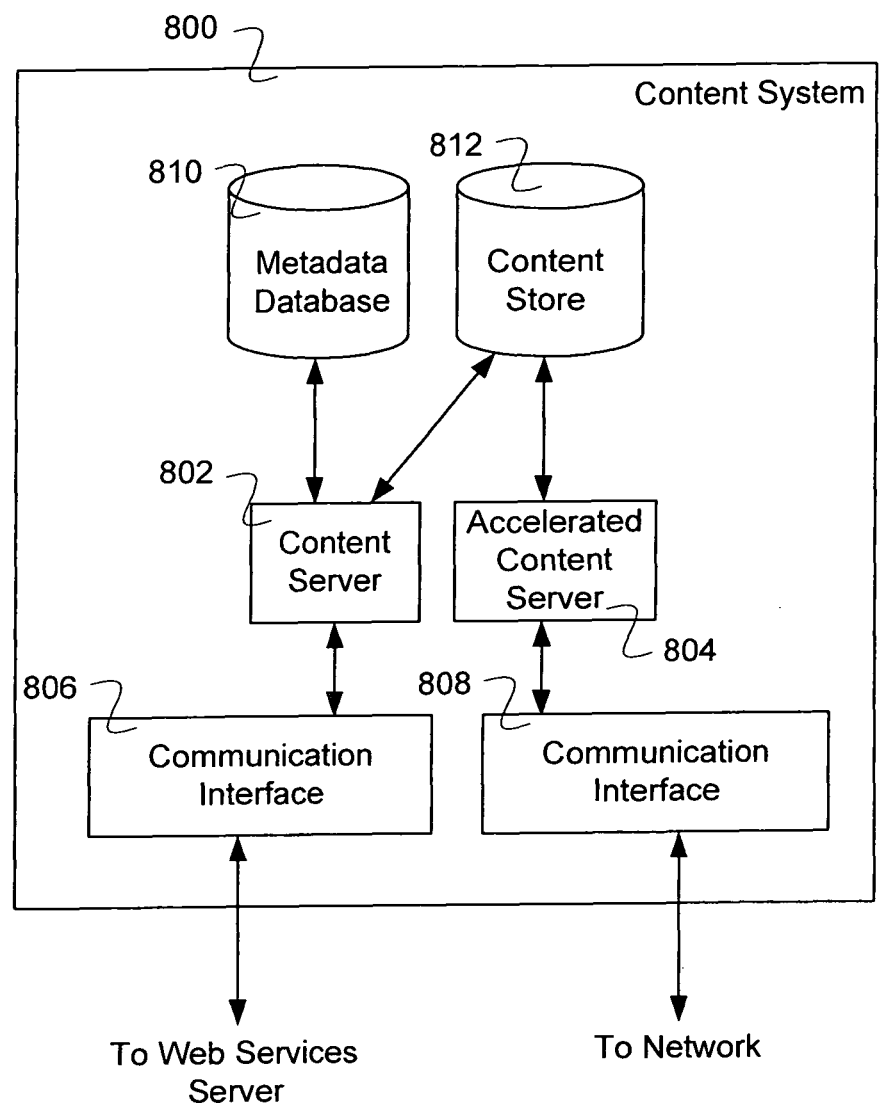
FIG. 8 is a block diagram illustrating an embodiment of a content system.

FIG. 8 is a block diagram illustrating an embodiment of a content system. In the example shown, content system 800 includes content server 802, accelerated content server 804, communication interface 806, communication interface 808, metadata database 810, and content store 812. In some embodiments, content store 812 is used to store one or more sets of managed content. In some embodiments, a set of managed content includes one or more stored content objects, such as documents, files, or other objects. In some embodiments, content server 802 is queried through communication interface 806 to search for relevant content to respond to a content request. Content server 802 searches for the relevant content by interrogating the metadata database 810 and/or the stored content in content 812. In some embodiments, content server 802 searches for the relevant content and returns information usable to access the relevant content where the relevant content is located in the content system and/or in one or more other content systems. In various embodiments, information returned by content system 800 to a requesting system (e.g., web services and/or other application server) includes for each content system able to service the request information regarding the distance from the content system to a source or destination client system or any other relevant metric. In some embodiments, a web services server uses information returned by the content system to select a content system to service a web services request through direct communication between a requesting client system and the selected content system, without content passing through the web services server. In some embodiments, the content system returns to the web services server and/or a content management client/agent on the requesting client system information only for a content system selected by the web services server and/or the content system to service the request.

Accelerated content server 804 is accessed directly from a network through communication interface 808 so that files can be directly read from and written to content store 812 by a remote system. In some embodiments, direct access of a content system by a remote system through a network improves performance by avoiding indirect data transfers, such as through a web services or other application server. In some embodiments, a content management system and/or other master node manages content stored in a distributed (e.g., at least partly redundant) manner in content system 800 and one or more other content system(s), e.g., by files or other stored objects are kept in appropriate states (e.g. up-to-date copies of files are kept in the content system and alternate content system(s)), tracking and controlling versions across content systems, checking files in/out, etc. In various embodiments, content system 800 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, metadata database 810 contains metadata information about the content in content store 812 and content in one or more alternate content stores. Examples of metadata include when and by whom documents were created, modified, edited, reviewed, and approved; keywords related to documents; version data; routing and collaboration data; date/time the content was created, modified, etc.; and data associating two or more stored objects with each other, e.g., to create and manage a "virtual" document or object. In various embodiments, metadata also include information about distances between remote systems and alternate content systems or any other relevant metric that may affect the selection or prioritized listing of alternate content systems that are interacted with by a remote system in response to a content request. In various embodiments, keywords in metadata database 810 are entered by the creator, editor, modifier, or approver of the document or by an automatic process or engine that scans the document to extract or identify relevant keywords, such as by using natural language or other linguistic technologies to identify key concepts based on the words comprising the document.

In some embodiments, content server 802 maintains a file system or other hierarchical organization or view of content in content store 812 and accelerated content server 804 has no file system of its own and instead uses the file system of content server 802 to read/write content from/to content store 812. In some embodiments, accelerated content server 804 comprises a web server.

In some embodiments, content server 802 has information regarding files, documents, or objects that have been transferred out of content store 812 and/or alternate content stores, i.e., objects that have been "checked out" for editing or other use by a user, enabling management of requests for content. In some embodiments, a content management system associated with the content server keeps track of which objects have been checked out. In some such embodiments, a subsequent request to the content management system to retrieve an object that has been checked out and has not yet been checked back in is denied, e.g., by sending a reply indicating the content is not currently available, is checked out to a user identified in the reply, etc.

Figure 9:
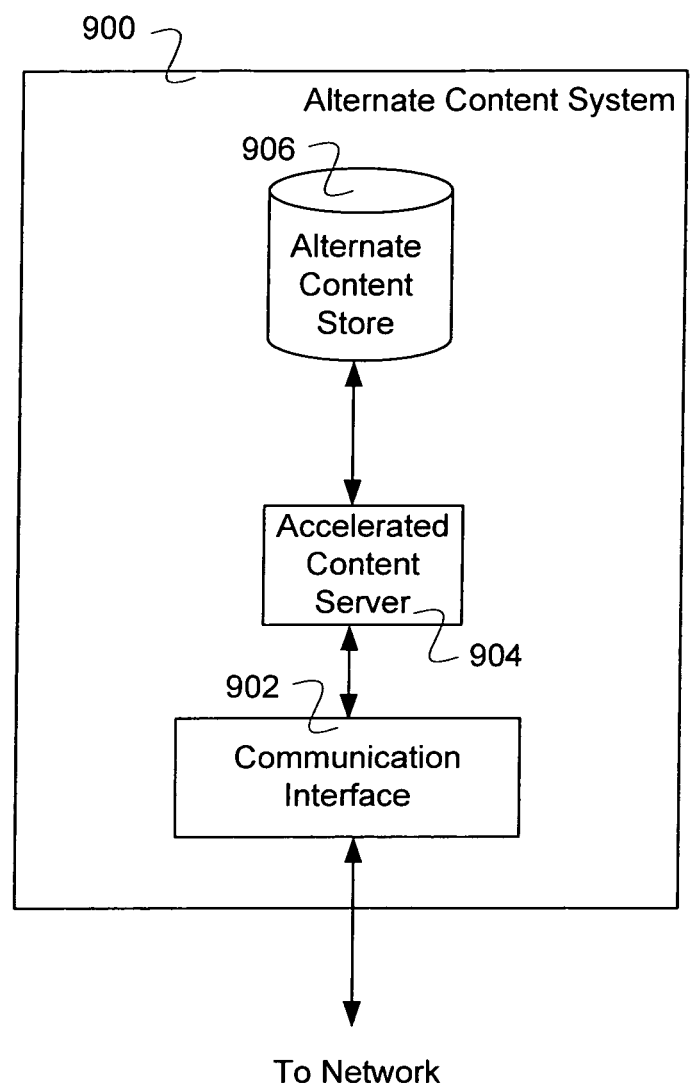
FIG. 9 is a block diagram illustrating an embodiment of an alternate content system.

FIG. 9 is a block diagram illustrating an embodiment of an alternate content system. In the example shown, alternate content system 900 includes communication interface 902, accelerated content server 904, and alternate content store 906. In some embodiments, alternate content store 906 is used to store one or more sets of managed content managed by a content management system. In some embodiments, a set of managed content includes one or more stored content objects, such as documents, files, or other objects. In some embodiments, a remote system queries a content management system, a web services or other application server, and/or a content server and the content management system, etc. replies with information usable by the remote system to read or write content directly with alternate content system 900. Alternate content store 906 is accessed by accelerated content server 904 from a network through communication interface 902. In various embodiments, a content management system, web services and/or other application server, or a content server selects alternate content system 900 as the appropriate system for a remote system to interact with based on being closer in distance to the remote system or because there is better access (e.g., faster network connection) between alternate content system 900 and the remote system.

Accelerated content server 904 is also accessed directly from a network through communication interface 902 so that files can be directly read from and written to alternate content store 906 by a content management system, a web services or other application server, or another content system. In some embodiments, direct access of alternate content system 900 by a remote system through a network improves performance by avoiding indirect data transfers through a content management system or a web services server and/or other application server, where alternate content system 900 is managed by a content management system so that content in a primary content system and one or more alternate content systems are kept in appropriate states (e.g. up-to-date copies of files are kept in the content system and alternate content system(s)). In various embodiments, alternate content system 900 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, accelerated content server 904 maintains a file system or other hierarchical organization or view of content in alternate content store 906. In some embodiments, alternate content system 900 also includes a content server and accelerated content server 904 has no file system of its own and instead uses the file system of the content server to read/write content from/to alternate content store 906. In some embodiments, accelerated content server 904 comprises a web server.

Figure 10:
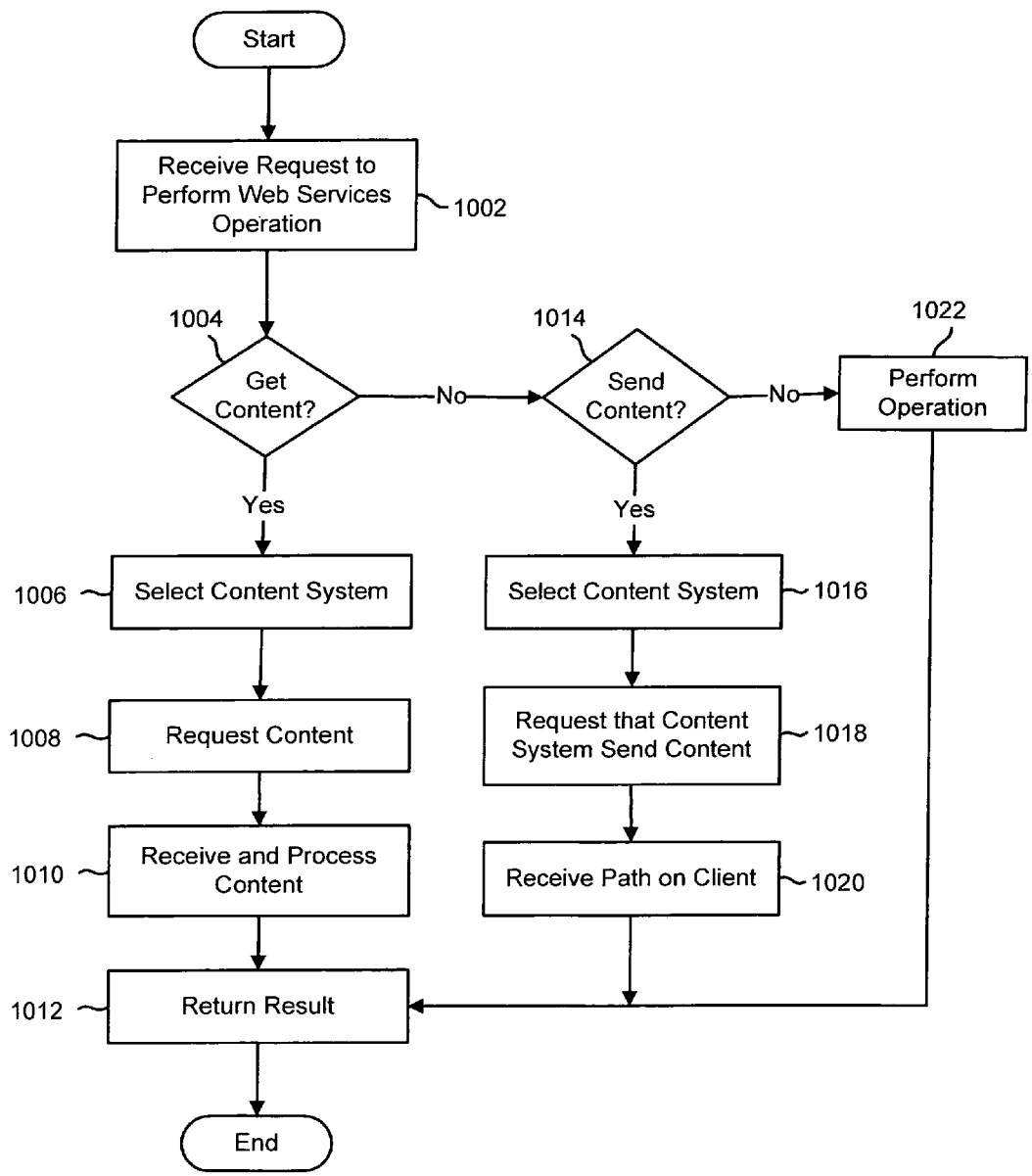
FIG. 10 is a flow chart illustrating an embodiment of a process for providing access via a web service to distributed managed content.

FIG. 10 is a flow chart illustrating an embodiment of a process for providing access via a web service to distributed managed content. In some embodiments, the process of FIG. 10 is implemented on a web services or other application server configured to project a content management function as a web service. At 1002, a request to perform a web services operation that requires access to managed content is received. If the request requires that the web services server obtain and process content data comprising a content item (1004), a content system is selected, from among one or more content systems comprising a distributed managed content system and/or repository, to obtain and/or provide the content (1006). In various embodiments, 1006 includes determining which content system(s) have or have access to the required content item (e.g., via a network connection to the requesting host/client, in the case of a file or other content item residing on the requesting host/client) and selecting from among the content system(s) having or having accessing to the required content item a selected content system to service the request. In various embodiments, the selection is based at least in part on one or more of a geographic location of the selected content system with respect to a host from which the request received at 1002 was received, a location within a network topology of the selected content system with respect to a host from which the request received at 1002 was received, and a network connection speed and/or bandwidth between the selected content system and a host from which the request received at 1002 was received. At 1008, the content item is requested from the content system selected at 1006. At 1010 the content item is received from the content system from which it was requested and processed as required by the operation requested at 1002, and at 1012 a result is returned to a client/host from which the request was received at 1002. If the request received at 1002 does not require that content be obtained for processing at the web services server (1004), it is determined at 1014 whether the request requires that a content item be retrieved and/or downloaded to a client/host form which the request received at 1002 was received. If so, at 1016 a content system is selected to service the request. In some embodiments, 1016 includes determining which of plurality of content systems comprising a distributed managed content system and/or repository can service the request (i.e., up-to-date version of the required content item is stored on the content system and it has connectivity to the requesting host/client) and from among those that can service request choosing a selecting content system to service the request, e.g., based on geography, network topology, connection speeds, etc. At 1018, the content system selected at 1016 is requested to send the content item to the host/client from which the request at 1002 was received. In some embodiments, the content system interacts with a content management client/agent on the requesting host/client to transfer the content item to the requesting host/client and cause it to be stored on the requesting host/client, e.g., in a file system or other location. At 1020, a file system path (or other location identifier) indicating where the content item was stored on the requesting client/host is received, which path is included in a result returned at 1012. If a requested web services operation does not require that a content item be retrieved for processing at the web services server and/or downloaded to the requesting host/client, at 1022 the requested operation is performed and any result returned at 1012, after which the process of FIG. 10 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a business object class that includes a business object method configured to access a managed content item in an existing content management infrastructure not developed originally as a web service, wherein the existing content management infrastructure includes a content management client and content server; and
   transforming the business object class to project a web services projection of the business object class, at least in part by:
   (1) parsing computer code associated with the business object class;
   (2) recognizing in the parsed code a portion associated with the business object method; and
   (3) exposing the business object method as a web service, at least in part by automatically generating code configured to:
      a) identify a string argument associated with an operation request;
      b) map the string argument to the managed content item; and
      c) use the mapping to send a request for access to the managed content item to a content management server within the existing content management infrastructure.

2. A method as recited in claim 1, wherein the business object class is received at a repository.

3. A method as recited in claim 1, wherein the business object class is configured to access the content item from a distributed body of managed content comprising one or more content items at least one of which is stored at each of a plurality of storage nodes.

4. A method as recited in claim 3, wherein the web service is configured to determine which of the plurality of storage nodes from which the content item is to be obtained.

5. A method as recited in claim 3, wherein the web service is configured to determine which of the plurality of storage nodes from which the content item is to be obtained based at least in part on one or more of the following: a respective geographic location of each of the respective storage nodes, a respective relative distance of each of the respective storage nodes from a requesting client, and a connection speed or bandwidth of a respective connection with the requesting client of each of the respective storage nodes.

6. A method as recited in claim 5:
   wherein the managed content item is stored on a content server and the business object class is configured to access the specified managed content item by requesting that the content server provide the content item to a host associated with a web services proxy from which each operation request is received;
   wherein exposing further comprises automatically generating code configured to receive from the content management server a location associated with the managed content item; and
   wherein the location is a file system path.

7. A method as recited in claim 1, wherein the managed content item resides on a host associated with a web services proxy from which each operation request is received.

8. A method as recited in claim 7, further comprising receiving the request to perform the operation and requesting that a content system obtain the content item from the host.

9. A method as recited in claim 8, wherein the content system is configured to obtain the content item from the host at least in part by communicating with a content management client on the host.

10. A method as recited in claim 1, wherein the managed content item is stored on a content server and the business object class is configured to access the specified managed content item by requesting that the content server provide the content item to a host associated with a web services proxy from which each operation request is received.

11. A method as recited in claim 10, wherein exposing further comprises automatically generating code configured to receive from the content management server a location associated with the managed content item.

12. A method as recited in claim 11, wherein the location is a path.

13. A method as recited in claim 10, wherein the content system is configured to provide the content item to the host at least in part by communicating with a content management client on the host.

14. A method as recited in claim 10, wherein the content system is configured to return to the web service a location at which the content item has been stored on the host.

15. A method as recited in claim 1, wherein accessing the managed content item is checking-in the managed content item.

16. A method as recited in claim 1, wherein accessing the managed content item is accessing a latest version of the managed content item.

17. A method as recited in claim 1, wherein accessing the managed content item is accessing a version of the managed content item from a closest distributed content management server.

18. A web services server comprising:
   a processor; and
   a memory coupled to the processor, wherein the memory is set to provide the processor with instructions which when executed cause the processor to:
   receive a business object class that includes a business object method configured to access a managed content item in an existing content management infrastructure not developed originally as a web service, wherein the existing content management infrastructure includes a content management client and content server; and
   transform the business object class to project a web services projection of the business object class, at least in part by:
   (1) parsing computer code associated with the business object class;
   (2) recognizing in the parsed code a portion associated with the business object method; and
   (3) exposing the business object method as a web service, at least in part by automatically generating code configured to:
      a) identify a string argument associated with an operation request;
      b) map the string argument to the managed content item; and c) use the mapping to send a request for access to the managed content item to a content management server within the existing content management infrastructure.

19. A server as recited in claim 18, further comprising a communication interface coupled to the processor and configured to receive a web services request associated with the web service.

20. A computer program product, the computer program product being embodied in a non-transitory computer readable storage medium comprising processor instructions to be executed by a processor to perform the steps of:
receiving a business object class that includes a business object method configured to access a managed content item in an existing content management infrastructure not developed originally as a web service, wherein the existing content management infrastructure includes a content management client and content server; and
transforming the business object class to project a web services projection of the business object class, at least in part by:
(1) parsing computer code associated with the business object class;
(2) recognizing in the parsed code a portion associated with the business object method; and
(3) exposing the business object method as a web service, at least in part by automatically generating code configured to:
a) identify a string argument associated with an operation request;
b) map the string argument to the managed content item; and
c) use the mapping to send a request for access to the managed content item to a content management server within the existing content management infrastructure.

21. A computer program product as recited in claim 20, wherein the business object class is configured to access the content item from a distributed body of managed content comprising one or more content items at least one of which is stored at each of a plurality of storage nodes.

22. A computer program product as recited in claim 21, wherein the web service is configured to determine which of the plurality of storage nodes from which the content item is to be obtained.

23. A server as recited in claim 18, wherein the business object class is configured to access the content item from a distributed body of managed content comprising one or more content items at least one of which is stored at each of a plurality of storage nodes.

24. A server as recited in claim 18, wherein the managed content item resides on a host associated with a web services proxy from which each operation request is received.

25. A server as recited in claim 18, wherein the managed content item is stored on a content server and the business object class is configured to access the specified managed content item by requesting that the content server provide the content item to a host associated with a web services proxy from which each operation request is received.

* * * * *